United States Patent
Pragada et al.

(10) Patent No.: US 11,552,874 B1
(45) Date of Patent: Jan. 10, 2023

(54) METHODS, SYSTEMS AND COMPUTER READABLE MEDIA FOR PROACTIVE NETWORK TESTING

(71) Applicant: Keysight Technologies, Inc., Santa Rosa, CA (US)

(72) Inventors: Vihari Durga Pragada, Cary, NC (US); Thomas Thorn, Angier, NC (US); Deep Datta, Austin, TX (US); David Evans, Austin, TX (US); Madhu Hosakoppa Rangappagowda, Cary, NC (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 2 days.

(21) Appl. No.: 16/251,365

(22) Filed: Jan. 18, 2019

(51) Int. Cl.
*H04L 43/50* (2022.01)
*H04L 43/062* (2022.01)
*H04L 43/12* (2022.01)
*H04W 24/08* (2009.01)
*H04L 43/16* (2022.01)
*H04W 24/06* (2009.01)
*H04L 43/55* (2022.01)

(52) U.S. Cl.
CPC ............ *H04L 43/50* (2013.01); *H04L 43/062* (2013.01); *H04L 43/12* (2013.01); *H04L 43/16* (2013.01); *H04L 43/55* (2022.05); *H04W 24/06* (2013.01); *H04W 24/08* (2013.01)

(58) Field of Classification Search
None
See application file for complete search history.

(56) References Cited

U.S. PATENT DOCUMENTS

| | | |
|---|---|---|
| 6,073,085 A | 6/2000 | Wiley et al. |
| 6,549,882 B1 | 4/2003 | Chen et al. |
| 6,625,648 B1 | 9/2003 | Schwaller et al. |
| 6,625,750 B1 | 9/2003 | Duso et al. |
| 6,651,093 B1 | 11/2003 | Wiedeman et al. |
| 6,763,380 B1 | 7/2004 | Mayton et al. |
| 7,278,061 B2 | 10/2007 | Smith |
| 7,730,029 B2 | 6/2010 | Molotchko et al. |
| 9,356,855 B2 | 5/2016 | Gintis |
| 9,641,419 B2 | 5/2017 | Gintis |

(Continued)

FOREIGN PATENT DOCUMENTS

| | | |
|---|---|---|
| KR | 10-1401990 B1 | 6/2014 |
| WO | WO 2016/077084 A1 | 5/2016 |

OTHER PUBLICATIONS

Non-Final Office Action for U.S. Appl. No. 15/608,352 (dated Mar. 20, 2019).

(Continued)

*Primary Examiner* — Jutai Kao

(57) ABSTRACT

The subject matter described herein includes methods, systems, and computer readable media for proactive network testing. One method for proactive network testing includes receiving, by a test controller and via a network tap, at least one metric associated with live network traffic; determining, by the test controller and using the at least one metric and a threshold value associated with the at least one metric, that a network test is to be performed; configuring, by the test controller, a first test agent to execute the network test; and executing, by the first test agent, the network test.

15 Claims, 5 Drawing Sheets

(56) References Cited

U.S. PATENT DOCUMENTS

| | | | |
|---|---|---|---|
| 10,205,938 B2 | 2/2019 | Regev et al. | |
| 10,425,320 B2 | 9/2019 | Nistor et al. | |
| 10,511,516 B2 | 12/2019 | Rangappagowda et al. | |
| 2003/0086425 A1 | 5/2003 | Bearden et al. | |
| 2003/0149765 A1 | 8/2003 | Hubbard et al. | |
| 2004/0003068 A1 | 1/2004 | Boldman et al. | |
| 2004/0066748 A1 | 4/2004 | Burnett | |
| 2004/0193709 A1 | 9/2004 | Selvaggi et al. | |
| 2005/0050190 A1 | 3/2005 | Dube | |
| 2006/0146703 A1 | 7/2006 | Cha et al. | |
| 2007/0081467 A1 | 4/2007 | Hurst et al. | |
| 2007/0266148 A1* | 11/2007 | Ruiz | H04L 41/5038 709/224 |
| 2008/0010523 A1 | 1/2008 | Mukherjee | |
| 2008/0056131 A1 | 3/2008 | Balakrishnan et al. | |
| 2008/0126561 A1 | 5/2008 | Ryu et al. | |
| 2009/0097409 A1 | 4/2009 | Akhter et al. | |
| 2010/0177644 A1 | 7/2010 | Kucharczyk | |
| 2011/0170433 A1 | 7/2011 | Scobbie | |
| 2012/0311132 A1 | 12/2012 | Tychon et al. | |
| 2014/0047112 A1 | 2/2014 | Komiya et al. | |
| 2014/0169189 A1 | 6/2014 | Kalkunte | |
| 2014/0229605 A1 | 8/2014 | Besser | |
| 2014/0355613 A1 | 12/2014 | Pope et al. | |
| 2015/0065121 A1* | 3/2015 | Gupta | H04W 28/04 455/424 |
| 2015/0106670 A1 | 4/2015 | Gintis | |
| 2015/0188788 A1 | 7/2015 | Kolesnik et al. | |
| 2016/0065419 A1 | 3/2016 | Szilagyi et al. | |
| 2016/0080243 A1 | 3/2016 | Kodama et al. | |
| 2016/0087861 A1 | 3/2016 | Kuan et al. | |
| 2016/0134864 A1 | 5/2016 | Regev et al. | |
| 2016/0182310 A1 | 6/2016 | Gintis | |
| 2016/0261472 A1 | 9/2016 | Tubi et al. | |
| 2016/0308709 A1* | 10/2016 | Fernandez-Palacios Gimenez | H04L 41/0618 |
| 2017/0171044 A1 | 6/2017 | Das et al. | |
| 2017/0180233 A1 | 6/2017 | Nistor et al. | |
| 2018/0062972 A1* | 3/2018 | Rangappagowda | H04L 43/0876 |
| 2018/0103011 A1* | 4/2018 | Li | H04L 43/062 |
| 2018/0176334 A1* | 6/2018 | Ye | H04L 47/10 |
| 2018/0270676 A1* | 9/2018 | Guven | H04W 24/06 |
| 2020/0028738 A1* | 1/2020 | Killadi | H04L 41/082 |

OTHER PUBLICATIONS

Notice of Allowance and Fee(s) Due for U.S. Appl. No. 14/984,459 (dated Jan. 18, 2019).
Notice of Allowance and Fee(s) Due and Applicant-Initiated Interview Summary, for U.S. Appl. No. 14/537,851 (dated Sep. 17, 2018).
Final Office Action for U.S. Appl. No. 14/984,459 (dated Jul. 12, 2018).
Communication of the extended European search report for European Application No. 15858789.9 (dated May 17, 2018).
Non-Final Office Action for U.S. Appl. No. 14/537,851 (dated Mar. 21, 2018).
Non-Final Office Action for U.S. Appl. No. 14/984,459 (dated Dec. 1, 2017).
Advisory Action for U.S. Appl. No. 14/537,851 (dated Sep. 20, 2017).
Communication of European publication number and information on the application of Article 67(3) EPC for European Patent Application No. 15858789.9 (dated Aug. 23, 2017).
Final Office Action for U.S. Appl. No. 14/537,851 (dated May 19, 2017).
Notice of Allowance and Fee(s) Due for U.S. Appl. No. 14/581,931 (dated Dec. 19, 2016).
Non-Final Office Action for U.S. Appl. No. 14/537,851 (dated Oct. 6, 2016).
Advisory Action & AFCP 2.0 Decision for U.S. Appl. No. 14/537,851 (dated Sep. 15, 2016).
Final Office Action for U.S. Appl. No. 14/537,851 (dated Jun. 6, 2016).
Notification of Transmittal of the International Search Report and the Written Opinion of the International Searching Authority, or the Declaration for International Application No. PCT/US2015/058297 (dated Feb. 24, 2016).
Non-Final Office Action for U.S. Appl. No. 14/537,851 (dated Nov. 20, 2015).
Commonly-Assigned, co-pending U.S. Appl. No. 14/581,931 for "Methods and Systems for Providing Background Pretesting of Communications or Storage Network Equipment," (Unpublished, filed Dec. 23, 2014).
"IxNetwork™ AVB Solution," Data Sheet, Document No. 915-1889-01 Rev A, www.ixiacom.com, pp. 1-18 (Oct. 2014).
"Hawkeye—Active Network Monitoring Platform," www.ixia.com, https://www.ixiacom.com/sites/default/files/2017-08/Ixia-V-DS-Hawkeye.pdf, pp. 1-7 (Aug. 2017).
"XR2000 Active Monitoring Hardware Endpoint for the Hawkeye™ and IxChariot® Product Lines," www.ixia.com, https://www.ixiacom.com/sites/default/files/resources/datasheet/xr2000.pdf, pp. 1-2 (Feb. 2016).
"IEEE Standard for Local and metropolitan area networks—Audio Video Bridging (AVB) Systems," IEEE Standards Association, IEEE Computer Society, IEEE Std 802.1BA™-2011, pp. 1-45 (Sep. 30, 2011).
"IEEE Standard for Layer 2 Transport Protocol for Time-Sensitive Applications in Bridged Local Area Networks," IEEE Standards Association, IEEE Computer Society, IEEE Std 1722™-2011, pp. 1-57 (May 6, 2011).
"IEEE Standard for Layer 3 Transport Protocol for Time-Sensitive Applications in Local Area Networks," IEEE Standards Association, IEEE Computer Society, IEEE Std 1733™-2011, pp. 1-21 (Apr. 25, 2011).
Kreibich et al., "Netalyzr: Illuminating Edge Network Neutrality, Security, and Performance," TR-10-006, International Computer Science Institute, pp. 1-17 (May 2010).
Teener, Michael Johas, "No. excuses Audio/Video Networking: the Technology Behind AVnu," AVnu™ Alliance White Paper, pp. 1-10 (Aug. 24, 2009).
Communication Pursuant to Article 94(3) EPC for European Patent Application Serial No. 15 858 789.9 (dated Nov. 11, 2019).
Notice of Allowance and Fee(s) Due for U.S. Appl. No. 15/608,352 (dated Sep. 18, 2019).
Notice of Allowance and Fee(s) Due for U.S. Appl. No. 14/984,459 (dated Apr. 15, 2019).
Communication pursuant to Article 94(3) EPC for European Patent Application Serial No. 15 858 789.9 (dated Mar. 29, 2019).
Decision to Grant a European Patent Pursuant to Article 97(1) EPC for European Application No. 15858789.9 (Nov. 19, 2020).
Decision to Grant a European Patent Pursuant to Article 97(1) EPC (Nov. 19, 2020).

\* cited by examiner

400

| TRIGGERS | TESTS TO PERFORM |
|---|---|
| APP1 IS 60% OR HIGHER OF TOTAL TRAFFIC | APP2 PERFORMANCE TEST, APP3 PERFORMANCE TEST |
| APP2 IS 75% OR HIGHER OF TOTAL TRAFFIC | APP1 PERFORMANCE TEST, APP3 PERFORMANCE TEST |
| APP3 IS 80% OR HIGHER OF TOTAL TRAFFIC | APP1 PERFORMANCE TEST, APP2 PERFORMANCE TEST, QoE TEST |
| 80% OR MORE OF BANDWIDTH USED | NETWORK CONNECTIVITY TEST, NETWORK QoE TEST |
| 5% OR LESS OF BANDWIDTH USED | NETWORK BANDWIDTH TEST |

FIG. 4

METHODS, SYSTEMS AND COMPUTER READABLE MEDIA FOR PROACTIVE NETWORK TESTING

TECHNICAL FIELD

The subject matter described herein relates to testing communications network equipment. More particularly, the subject matter described herein relates to methods, systems, and computer readable media for proactive network testing.

BACKGROUND

Data network service providers (such as Internet service providers), network users, and application providers all have an interest in learning how data network traffic of a particular type is treated by the network. For example, data network service providers may wish to monitor how application traffic of different types is treated by their networks and by other networks to ensure compliance with net neutrality regulations, service level agreements with other service providers, and service level agreements with end users. Network users, including individuals, businesses, and other entities, may desire to know how application traffic is treated to identify when a network service provider is throttling traffic and whether the throttling is consistent with the service agreement between the network service providers and the users. Application services providers may wish to know how their traffic is treated in the network, for example to identify when their traffic is throttled by the network service provider.

Network testing, e.g., performance testing, is one way to identify how traffic of a particular application type is being treated by the network. It may be desirable to perform network testing in various scenarios and/or at different times. It may also be desirable to perform network testing automatically or without user involvement.

Accordingly, there exists a need for methods, systems, and computer readable media for proactive network testing.

SUMMARY

The subject matter described herein includes methods, systems, and computer readable media for proactive network testing. One method for proactive network testing includes receiving, by a test controller and via a network tap, at least one metric associated with live network traffic; determining, by the test controller and using the at least one metric and a threshold value associated with the at least one metric, that a network test is to be performed; configuring, by the test controller, a first test agent to execute the network test; and executing, by the first test agent, the network test.

The subject matter described herein for proactive network testing may be implemented in hardware, software, firmware, or any combination thereof. As such, the terms "function" or "module" as used herein refer to hardware, software, and/or firmware for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Embodiments of the subject matter described herein will now be explained with reference to the accompanying drawings, wherein like reference numerals represent like parts, of which:

FIG. 4 is a diagram illustrating example network testing threshold data.

DETAILED DESCRIPTION

The subject matter described herein includes methods, systems, and computer readable media for proactive network testing. Network operators generally use network testing to test for various network issues. However, significant network impact can occur before a network operator is aware, thereby increasing cost, delaying repair, and decreasing network users' experience.

In accordance with some aspects of the subject matter described herein, techniques, methods, or mechanisms are disclosed for proactive network testing. For example, a test controller may use network taps to monitor live network traffic and detect network conditions or trends and may initiate network testing if the detected network conditions or trends meet or exceed some predefined trigger conditions. In this example, the test controller can perform network testing proactively, e.g., before a network operator is notified or aware of a potential issue.

Advantageously, in accordance with some aspects of the subject matter described herein, network testing may be improved by using network taps that monitor application usage and/or traffic related metrics. By using network taps to detect and/or identify traffic trends and conditions, a test controller can use this information to initiate and/or perform proactive network testing. By performing proactive network testing, a network operator can potentially avoid significant network impact by identifying issues or potential issues quickly, e.g., by having a test controller automatically perform network testing in response to network conditions meeting or exceeding one or more trigger conditions.

Figure 1:
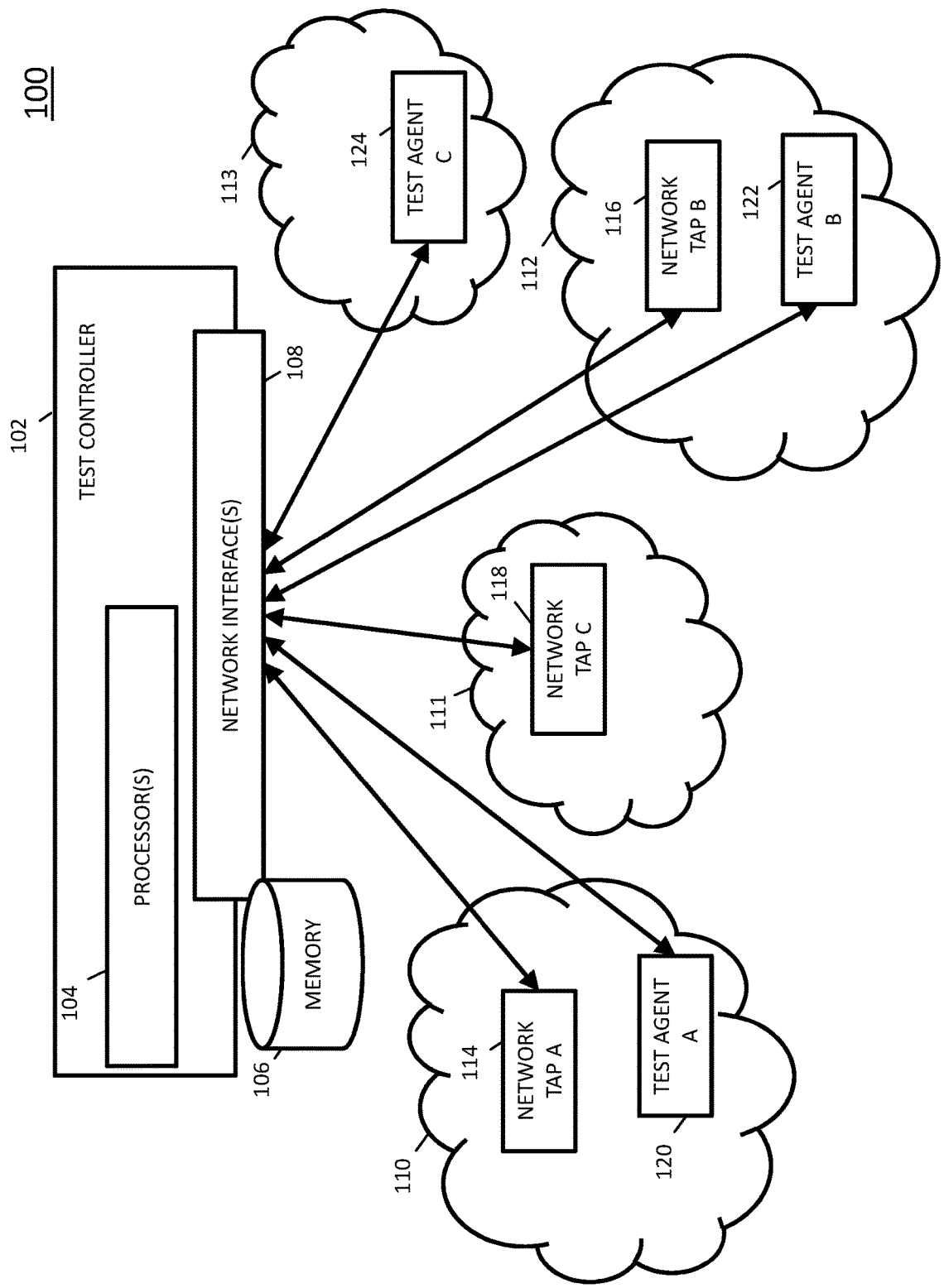
FIG. 1 is a network diagram illustrating an example system for proactive network testing.

FIG. 1 is a network diagram illustrating an example system 100 for proactive network testing. Referring to FIG. 1, test system 100 may include a network equipment test controller 102 for testing network equipment and/or related networks 110-113. Each of networks 110-113 may represent a public network (e.g., the internet), a private network (e.g., an enterprise network), or a semi-private network (e.g., a cloud-based network) and may include various network nodes, such as switches, routers, and servers.

Test controller 102 may represent any suitable entity (e.g., one or more computing platforms or a testing tool implemented using at least one processor) for performing various aspects associated with performing network testing. Test controller 102 may include at least one processor 104 and memory 106. Test controller 102 may also include one or more network interface(s) 108. For example, network interface(s) 108 may include a test configuration and monitoring interface for communicating with test agents 120-124 and a second interface for communicating with network taps 114-118. In some examples, test controller 102 may be implemented using the Hawkeye™ web server available from Keysight of California.

Each of network taps 114-118 may represent any suitable entity (e.g., one or more computing platforms or network tap software implemented using at least one processor) for monitoring traffic and/or observing network behavior. For example, network tap 114 may monitor network traffic traversing a physical or virtual data link and may compute various metrics associated with the network traffic. In this example, the metrics may relate to bandwidth utilization and/or a traffic breakdown by applications or protocols. In some examples, each of network taps 114-118 may be implemented using the Vision One™ network packet broker executing AppStack™ software available from Keysight of California.

Each of test agents 120-124 may represent any suitable entity (e.g., one or more computing platforms or network tap software implemented using at least one processor) for monitoring traffic and/or observing network behavior. The system illustrated in FIG. 1 further includes one or more test agents. Test agents 120-124 may include hardware test agents and/or software test agents. Test agents 120-124 may include network test functions that implement network tests using test configuration information obtained from test controller 102. In some embodiments, test agents 120-124 may be designed to be deployed in live networks to perform network testing and monitoring. In some examples, a hardware platform suitable for implementing hardware test agents includes the XR2000 Active Monitoring Hardware Agent available from Keysight of California. In some examples, software test agents may be designed to execute on and utilize the resources of network devices, which may be data center file servers, access points, or other network devices.

In some embodiments, network taps 114-118 may be configurable by test controller 102 to perform various aspects of traffic monitoring and reporting. For example, test controller 102 may configure network taps 114-118 to monitor network traffic and to report various traffic related metrics to test controller 102 periodically (e.g., every five minutes) or aperiodically (e.g., dynamically or after detecting a network condition).

In some embodiments, packet filters and/or analysis logic for monitoring network traffic may be stored in memory 106 and may be provisioned by test controller 102. For example, at initialization or other suitable times, test controller 102 may push or provide packet filters and/or analysis logic to network taps 114-118 and/or test agents 120-124 deployed within a monitored network.

In some embodiments, test agents 120-124 may be configurable by test controller 102 to perform various aspects of proactive network testing. For example, test controller 102 may configure test agents 120-124 to perform network testing in response to determining that detected network conditions (e.g., as reported by network taps 114-118) met or exceeded predefined trigger rules. In this example, the network testing may be initiated before notifying a network operator or without notifying a network operator.

In some embodiments, network testing (e.g., performance testing to monitor user experience, service provider compliance with service level agreements, or service provider treatment of particular application traffic) may be performed if a traffic related metric (e.g., a bandwidth utilization metric) meets or exceeds a given threshold value (e.g., as indicated by a trigger rule defined at memory 106).

In some embodiments, performance testing may include sending synthetic application traffic of a particular type (such as streaming video traffic) from one test agent to another test agent over a network to monitor how the network performs for the application traffic of the particular type. For example, it may be desirable to monitor how the network treats social media traffic, such as Facebook traffic or streaming media service traffic, such as Netflix or YouTube traffic. It may be of particular interest to determine whether any of the traffic of the particular application types is being throttled by the network service provider. Performance metrics, such as bit rate, jitter, and latency may be obtained for the synthetic application traffic of the particular type and compared to service level agreements. If synthetic streaming video traffic is being transmitted over the network, the average bit rate, latency, and jitter may be recorded and compared to parameters of a network user's subscription with the user's data network service provider.

In some embodiments, test agents 120-124 may execute network performance tests proactively, e.g., after network conditions (e.g., traffic metrics) are detected that meets or exceeds trigger conditions (e.g., threshold values) but before a network operator becomes aware. In such embodiments, one or more test system entities (e.g., test agents 120-124 and/or network taps 114-118) may monitor test traffic and report the results to test controller 102. The results may include network performance measurements, such as bit rate, jitter, and latency for the simulated network traffic of the particular type.

In some embodiments, one or more test system entities (e.g., test agent 120) may be configured to generate and receive test packets or test packet flows that are directed to or from another test system entity (e.g., test agent 122 or test controller 102). In such embodiments, a test system entity (e.g., test controller 102) may effectively monitor and analyze live traffic within the monitored network (e.g., using various filters and analysis logic provisioned or provided via test controller 102) and in response to the detection of certain trigger conditions (e.g., packet or packet flow conditions or events), may initiate and/or execute certain types of test packets or test packet flows within the monitored network.

In some embodiments, after analyzing test results or related data from test system entities, test controller 102 may provide a test report and/or diagnostics report to a network operator for review and/or further actions. By proactively performing network testing and providing test results to a network operator, the impact on the network from potential issues can be potentially minimized.

It will be appreciated that FIG. 1 is for illustrative purposes and that various depicted entities, their locations, and/or their functions described above in relation to FIG. 1 may be changed, altered, added, or removed. For example, in some embodiments, test agents 120-124 may include network taps 114-118 or similar functionality.

Figure 2:
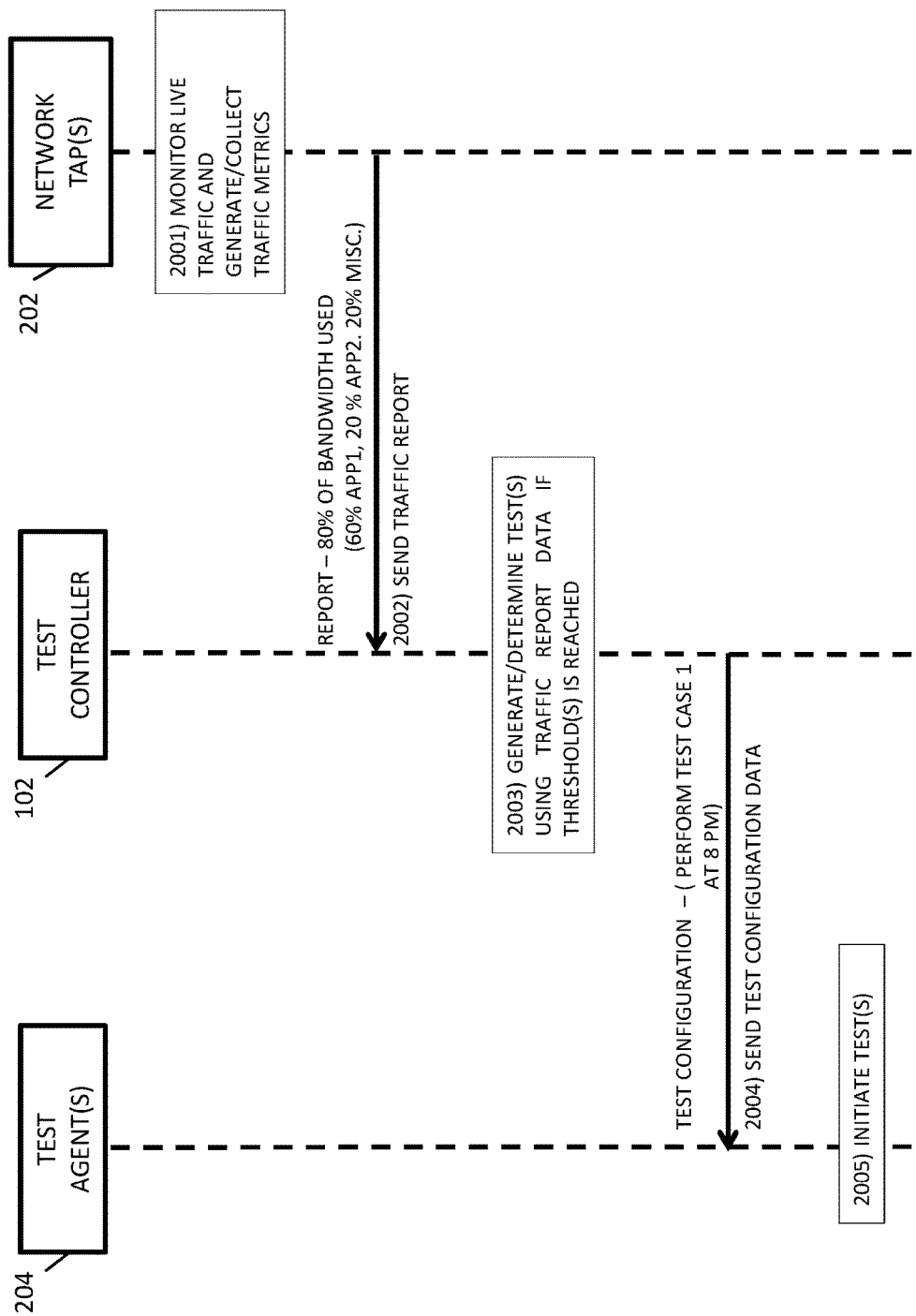
FIG. 2 is a message flow diagram illustrating an example message flow for proactive network testing.

FIG. 2 is a message flow diagram illustrating an example message flow 200 for proactive network testing. In some embodiments, proactive network testing may occur in response to one or more trigger conditions (e.g., threshold values) being met or exceeded.

Referring to FIG. 2, network tap(s) 202 may represent one or more of network taps 114-118 or may include similar functionality and test agent(s) 204 may represent one or more of test agents 120-124 or may include similar functionality.

In step 2001, network tap(s) 202 may monitor live network traffic in one or more networks associated with test system 100 and may generate or collect traffic metrics associated with the live network traffic. For example, network tap(s) 202 may monitor and record the amount of traffic associated with particular applications, e.g., YouTube, Facebook, etc.

In step 2002, network tap(s) 202 may send a traffic report containing the traffic metrics. For example, a traffic report may indicate the percentage of bandwidth utilized during a monitored time period and may indicate the breakdown of the traffic by application or protocol.

In step 2003, using traffic report data, test controller 102 may generate and/or determine test(s) if a trigger or a related threshold is met or exceeded. For example, test controller 102 may query a data store containing a number of triggers (e.g., trigger rules and/or threshold values) and related tests to be performed. In this example, if a trigger condition is met, then test controller 102 may initiate a related test (e.g., by configuring and/or commanding test agent(s) 204) to execute the test.

In step 2004, test controller 102 may send test configuration information to test agent(s) 204. For example, test configuration information may indicate a test to perform (e.g., Test Case '1') and related test scheduling data (e.g., perform in four hours or at 8 pm).

In some embodiments, performance test software, including a number of performance tests, may be loaded on test agent(s) 204 prior to initiation of message flow 200. In such an example, test controller 102 may configure test agent(s) 204 to execute the performance test by sending messages to the test agents indicating which performance test to perform.

In some embodiments, performance test software, lacking some performance tests, may be loaded on test agent(s) 204 prior to initiation of message flow 200. In such an example, test controller 102 may configure test agent(s) 204 to execute the performance test by sending messages to test agent(s) 204 defining a performance test, e.g., test traffic, metrics to monitor, or related test data.

In step 2005, test agent(s) 204 may initiate and/or perform test(s) associated with the test configuration information. For example, test agent(s) 204 may be instructed to perform network testing in response to test controller 102 determining a trigger condition was met or exceeded using data from network tap(s) 202.

It will be appreciated that FIG. 2 is for illustrative purposes and that various depicted messages and details for initiating and/or performing proactive network testing described above in relation to FIG. 2 may be changed, altered, added, or removed.

Figure 3:
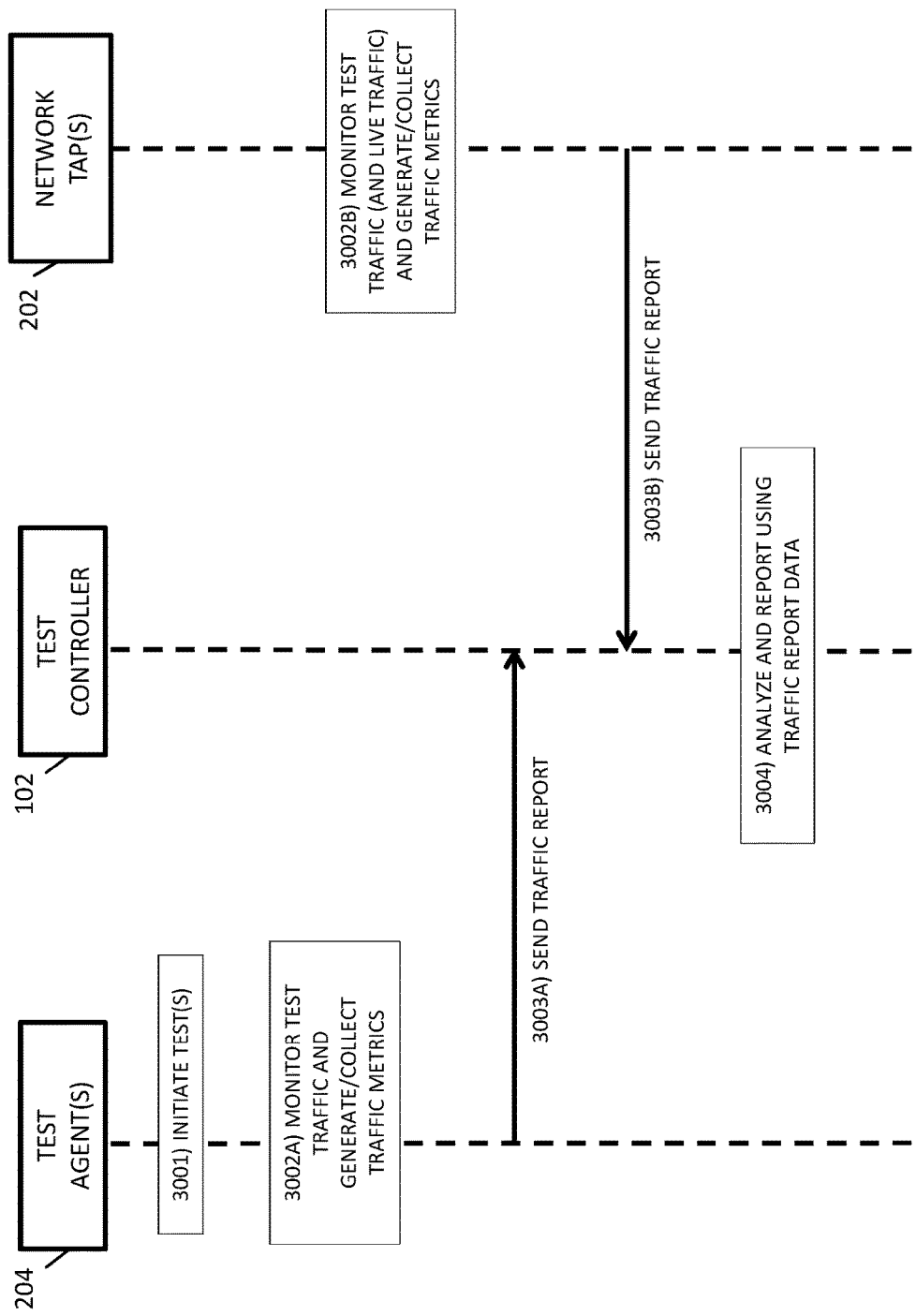
FIG. 3 is a message flow diagram illustrating an example message flow for reporting network testing.

FIG. 3 is a message flow diagram illustrating an example message flow 300 for reporting network testing. In some embodiments, network testing reports may be generated after network testing is initiated or performed and metrics and/or other test results are received from test agent(s) 204 and/or network tap(s) 202.

Referring to FIG. 3, in step 3001, test agent(s) 204 may initiate and/or perform network test(s) requested or directed by test controller 102. For example, test agent(s) 204 may be instructed to perform network testing in response to test controller 102 determining a trigger condition was met or exceeded using data from network tap(s) 202.

In some embodiments, test traffic (e.g., test packets or flows) may be generated according to a time schedule established by test controller 102. For example, test traffic may only be generated and injected into a monitored network at times when network usage is low (e.g., late in the evening). In this example, one or more test system entities (e.g., network tap(s) 202 and/or test agent(s) 204) the system may be adapted to receive and analyze the generated test traffic, and to report associated metrics. Continuing with this example, test controller 102 or another test system entity may be adapted to receive, filter, and analyze reported metrics and/or other test data and report the data to a test operator or a management system, thereby intelligently monitoring and proactively testing a monitored network in a manner that does not significantly interfere or degrade performance of the monitored network.

In steps 3002A-B, network tap(s) 202 and test agent(s) 204 may monitor test network traffic in one or more networks associated with test system 100 and may generate or collect traffic metrics associated with the test network traffic.

In step 3003A-B, network tap(s) 202 and test agent(s) 204 may send a traffic report containing the traffic metrics. For example, a traffic report may indicate jitter, latency, bit rate, and/or other metrics.

In step 3004, test controller 102 may receive and analyze traffic reports and may generate a test report using the traffic report data. For example, test controller 102 may generate a test report and send the test report to a test operator for review.

It will be appreciated that FIG. 3 is for illustrative purposes and that various depicted messages and details for reporting network testing results described above in relation to FIG. 3 may be changed, altered, added, or removed.

FIG. 4 is a diagram illustrating example network testing trigger data 400. In some embodiments, trigger data 400 may be accessed and/or stored by test system 100, test controller 102 and/or other entities using various data structures. In some embodiments, trigger data 400 may include any suitable information, such as rules, percentages, numbers, or other values, for indicating when to trigger and/or perform network testing.

Referring to FIG. 4, trigger data 400 may be depicted using a table representing associations between triggers and test(s) to perform. In some embodiments, trigger data 400 may be stored or maintained in memory 106 and may be usable for generating, verifying, or analyzing test messages or test scenarios.

As depicted in FIG. 4, each row represents a trigger and one or more corresponding tests to be performed. For example, a trigger may be based on an application traffic bandwidth utilization metric generated and/or provided by network tap 114. In this example, the trigger may indicate that if traffic from an application 'App1' is 60% or more of the total traffic measured during a particular time interval, a set of tests are to be performed. Continuing with this example, the tests may be performed by test agent 120 and/or other test agents to determine whether certain other applications are affected by the traffic associated with application 'App1'. In another example, a trigger may be based on a network bandwidth utilization metric generated and/or provided by network tap 116. In this example, the trigger may indicate that if 80% or more of the network bandwidth is used, a set of tests are to be performed. Continuing with this example, the tests may be performed by test agent 122 and/or other test agents to determine whether the network and/or network users are experiencing issues. In another example, a trigger may be based on a network bandwidth utilization metric generated and/or provided by network tap 118. In this example, the trigger may indicate that if 5% or less of the network bandwidth is used, a network bandwidth test is to be performed. Continuing with this example, the test may be performed by test agent 124 and/or other test agents to determine whether the network and/or network users are experiencing issues.

It will be appreciated that trigger data 400 in FIG. 4 is for illustrative purposes and that different and/or additional information may also be stored or maintained. Further, it will be appreciated that trigger data 400 may be stored in various data structures, memories, media, and/or in one or more locations.

Figure 5:
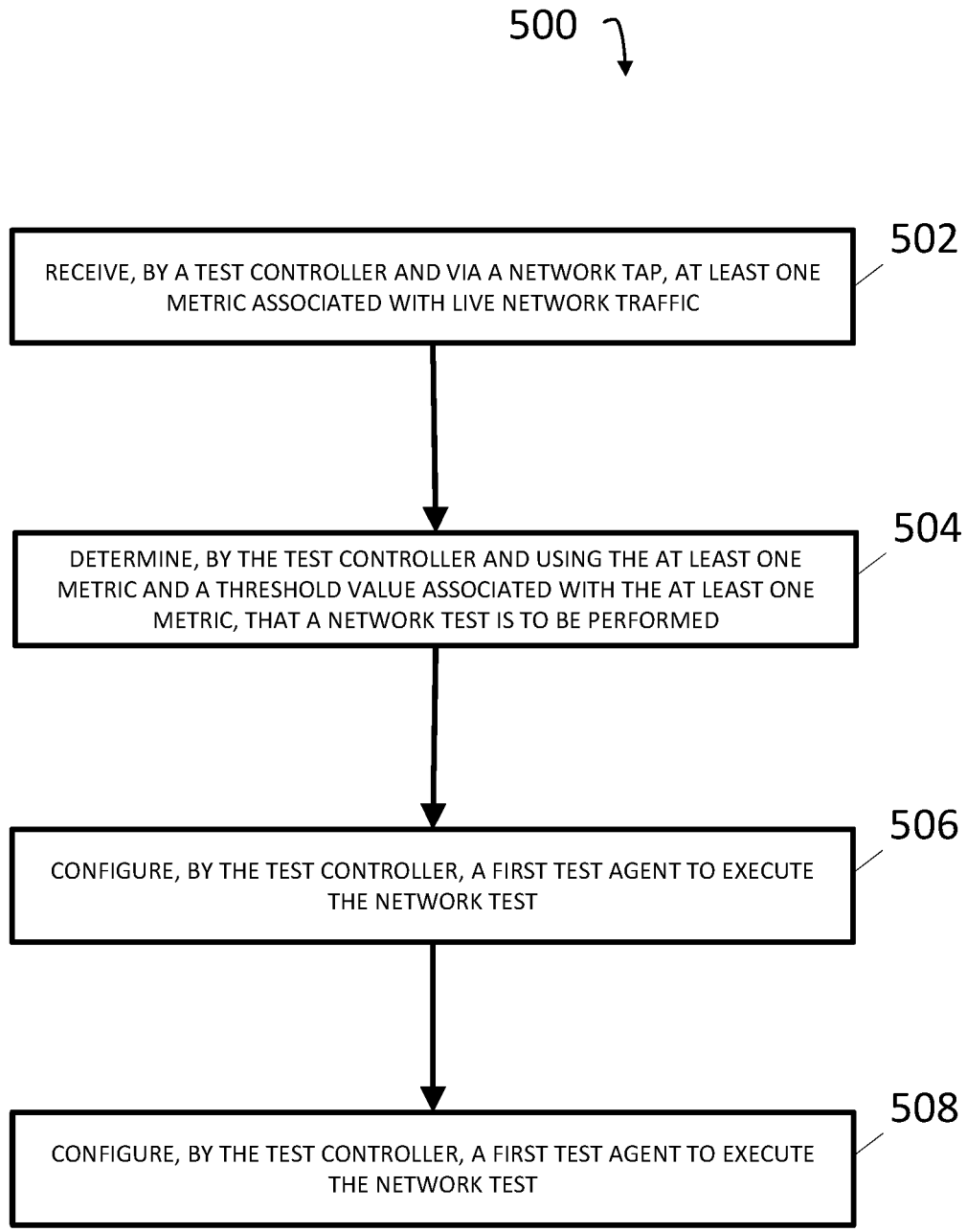
FIG. 5 is a flow chart illustrating an example process for proactive network testing.

FIG. 5 is a diagram illustrating an example process 500 for proactive network testing. In some embodiments, process 500, or portions thereof, may be performed by or at test system 100, test controller 102, test agent 120-124, and/or another node or module. In some embodiments, process 500 may include steps 502, 504, 506, and/or 508.

Referring to process 500, in step 502, at least one metric associated with live network traffic may be received by a test controller and via a network tap. In some embodiments, metrics received by a test controller may be obtained via a network tap directly or indirectly. For example, a network tap may gather various data and/or generate metrics and may send the information to a network monitoring system or an intermediate node which processes the information from the network tap and, optionally, information from other network taps or network nodes. In this example, the network monitoring system may send data (e.g., correlated or aggregated metrics) to test controller 102 for further processing. In another example, a network tap may gather data and/or generate metrics and may send the information to test controller 102 directly (e.g., without the information traversing a network monitoring system).

In some embodiments, at least one metric associated with live network traffic may include a total bandwidth utilization metric, a bandwidth utilization metric associated with a user or a device, a bandwidth utilization metric associated with an application or a protocol, a jitter metric, a delay metric, a quality of service (QoS) metric, a quality of experience (QoE) metric, a bit rate metric, or a speed metric.

In step 504, it may be determined, by the test controller and using the at least one metric and a threshold value associated with the at least one metric, that a network test is to be performed. In some embodiments, determining that a network test is to be performed may include querying a data store containing a plurality of test triggering conditions, wherein each test triggering condition indicates one or more threshold values for different metrics and corresponding network tests to be performed if respective threshold values are met or exceeded.

In some embodiments, determining that a network test is to be performed may include determining that the at least one metric meets or exceeds a threshold value associated with the at least one metric, wherein the threshold value indicates the network test to be performed.

In step 506, a first test agent may be configured, by the test controller, to execute the network test. In some embodiments, a test agent may comprise a software-only test agent configured to execute on a network device or a hardware test agent dedicated to network testing.

In step 508, the network test may be executed by the first test agent. In some embodiments, executing a network test may include executing an application-specific network test for monitoring performance of the network with respect to application traffic of a particular type.

In some embodiments, executing an application-specific network test may include transmitting synthetic application traffic for the application of the particular type from a first test agent to a second test agent and measuring network performance for the synthetic application traffic.

In some embodiments, e.g., after or while executing a network test, test traffic metrics associated with the network test may be analyzed, wherein the test traffic metrics may be provided by the network tap and/or the first test agent; and test results may be reported to a test operator or system.

In some embodiments, at least one metric associated with live network traffic may be used to adjust a threshold value associated with the at least one metric. For example, test controller 102 may use a historical means-based algorithm that monitors one or more metrics over a period of time (e.g., 24 hours, 3 days, 7 days, etc.) and computes a mean value for each of the one or more metrics. In this example, if the mean value associated with a first metric exceeds a threshold value (e.g., a value for triggering a proactive test) associated with the first metric, test controller 102 may adjust (e.g., increase) the threshold value based on the mean value.

It will be appreciated that process 500 is for illustrative purposes and that different and/or additional actions may be used. It will also be appreciated that various actions described herein may occur in a different order or sequence.

It should be noted that test system 100, test controller 102, network taps 114-118, test agents 120-124, and/or functionality described herein may constitute a special purpose computing device. Further, test system 100, test controller 102, network taps 114-118, test agents 120-124, and/or functionality described herein can improve the technological field of network testing. For example, network tap 114 may monitor network traffic and generate an application usage metric. In this example, test controller 102 can configure various test agents 120-124 to perform proactive network testing if a threshold value associated with the application usage metric is met or exceeded, e.g., if 80% percentage of the traffic monitored is associated with a particular application or protocol.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for proactive network testing, the method comprising:
 receiving, by a test controller and via a network tap, at least one metric associated with live network traffic, wherein the at least one metric associated with the live network traffic includes a percentage of traffic associated with a particular application type relative to a total amount of traffic;
 determining, by the test controller and using the at least one metric and a threshold value associated with the at least one metric, that a network test is to be performed, wherein determining, using the at least one metric, that the network test is to be performed includes querying, using the at least one metric, a data store containing a plurality of test triggering conditions for proactively testing a network before a network operator becomes aware of an issue, wherein each test triggering condition indicates one or more threshold values for different metrics and corresponding network tests to be performed if respective threshold values are met or exceeded;

configuring, by the test controller, a first test agent to execute the network test, wherein the network test is scheduled to be executed; and executing, by the first test agent, the network test as scheduled, wherein executing the network test includes executing an application-specific network test for monitoring performance of the network with respect to application traffic of the particular application type.

2. The method of claim 1 comprising:

analyzing test traffic metrics associated with the network test, wherein the test traffic metrics are provided by the network tap and/or the first test agent; and reporting test results to a test operator or system.

3. The method of claim 1 comprising:

using the at least one metric associated with the live network traffic to adjust the threshold value associated with the at least one metric.

4. The method of claim 1 wherein the at least one metric includes a total bandwidth utilization metric, a bandwidth utilization metric associated with a user or a device, a bandwidth utilization metric associated with an application or a protocol, a jitter metric, a delay metric, a quality of service (QoS) metric, a quality of experience (QoE) metric, a bit rate metric, or a speed metric.

5. The method of claim 1 wherein determining, using the at least one metric, that the network test is to be performed includes determining that the at least one metric meets or exceeds a threshold value associated with the at least one metric, wherein the threshold value indicates the network test to be performed.

6. The method of claim 1 wherein the first test agent comprises a software-only test agent configured to execute on a network device or a hardware test agent dedicated to network testing.

7. The method of claim 1 wherein executing the application-specific network test includes transmitting synthetic application traffic for the application of the particular type from a first test agent to a second test agent and measuring network performance for the synthetic application traffic.

8. A system for proactive network testing, the system comprising:

a test controller for receiving, via a network tap, at least one metric associated with live network traffic, wherein the at least one metric associated with the live network traffic includes a percentage of traffic associated with a particular application type relative to a total amount of traffic, determining, using the at least one metric and a threshold value associated with the at least one metric, that a network test is to be performed, wherein determining, using the at least one metric, that the network test is to be performed includes querying, using the at least one metric, a data store containing a plurality of test triggering conditions for proactively testing a network before a network operator becomes aware of an issue, wherein each test triggering condition indicates one or more threshold values for different metrics and corresponding network tests to be performed if respective threshold values are met or exceeded, and configuring a first test agent to execute the network test, wherein the network test is scheduled to be executed; and the first test agent for executing the network test as scheduled, wherein executing the network test includes executing an application-specific network test for monitoring performance of the network with respect to application traffic of the particular application type.

9. The system of claim 8 wherein the test controller is configured for analyzing test traffic metrics associated with the network test, wherein the test traffic metrics are provided by the network tap and/or the first test agent and wherein the test controller is configured for reporting test results to a test operator or system.

10. The system of claim 8 wherein the test controller is configured for using the at least one metric associated with the live network traffic to adjust the threshold value associated with the at least one metric.

11. The system of claim 8 wherein the at least one metric includes a total bandwidth utilization metric, a bandwidth utilization metric associated with a user or a device, a bandwidth utilization metric associated with an application or a protocol, a jitter metric, a delay metric, a quality of service (QoS) metric, a quality of experience (QoE) metric, a bit rate metric, or a speed metric.

12. The system of claim 8 wherein the test controller is configured for determining that the at least one metric meets or exceeds a threshold value associated with the at least one metric, wherein the threshold value indicates the network test to be performed.

13. The system of claim 8 wherein the first test agent comprises a software-only test agent configured to execute on a network device or a hardware device dedicated to network testing.

14. The system of claim 8 wherein the application-specific network test includes transmitting synthetic application traffic for the application of the particular type from a first test agent to a second test agent and measuring network performance for the synthetic application traffic.

15. A non-transitory computer readable medium having stored thereon executable instructions that when executed by at least one processor of at least one computer cause the at least one computer to perform steps comprising:

receiving, by a test controller and via a network tap, at least one metric associated with live network traffic, wherein the at least one metric associated with the live network traffic includes a percentage of traffic associated with a particular application type relative to a total amount of traffic;

determining, by the test controller and using the at least one metric and a threshold value associated with the at least one metric, that a network test is to be performed, wherein determining, using the at least one metric, that the network test is to be performed includes querying, using the at least one metric, a data store containing a plurality of test triggering conditions for proactively testing a network before a network operator becomes aware of an issue, wherein each test triggering condition indicates one or more threshold values for different metrics and corresponding network tests to be performed if respective threshold values are met or exceeded;

configuring, by the test controller, a first test agent to execute the network test, wherein the network test is scheduled to be executed; and executing, by the first test agent, the network test as scheduled, wherein executing the network test includes executing an application-specific network test for monitoring performance of the network with respect to application traffic of the particular application type.

* * * * *